United States Patent
Rogers et al.

(10) Patent No.: US 8,508,722 B2
(45) Date of Patent: Aug. 13, 2013

(54) LASER DOPPLER VELOCIMETER

(75) Inventors: Phillip L. Rogers, Hume, VA (US);
Chia Chen Chang, Rockville, MD (US);
Priyavadan Mamidipudi, Bristow, VA (US); Lance Leclair, Manassas, VA (US); Peter Gatchell, Nokesville, VA (US); Daniel Dakin, Great Falls, VA (US); Elizabeth Dakin, Great Falls, VA (US)

(73) Assignee: Optical Air Data Systems, LLC, Manassas, VA (US)

( * ) Notice: Subject to any disclaimer, the term of this patent is extended or adjusted under 35 U.S.C. 154(b) by 100 days.

(21) Appl. No.: 12/988,248

(22) PCT Filed: Apr. 30, 2008

(86) PCT No.: PCT/US2008/005515
§ 371 (c)(1),
(2), (4) Date: Oct. 15, 2010

(87) PCT Pub. No.: WO2009/134221
PCT Pub. Date: Nov. 5, 2009

(65) Prior Publication Data
US 2011/0037970 A1    Feb. 17, 2011

(51) Int. Cl.
*G01P 3/36* (2006.01)
(52) U.S. Cl.
USPC .......................................... 356/28; 356/28.5
(58) Field of Classification Search
USPC ......... 356/28–28.5, 4.1, 5.09, 323; 342/25 F, 342/84, 99, 105, 357.78
See application file for complete search history.

(56) References Cited

U.S. PATENT DOCUMENTS

| | | | |
|---|---|---|---|
| 4,451,916 A * | 5/1984 | Casper et al. | 714/4.3 |
| 4,718,121 A | 1/1988 | Epworth | |
| 4,728,168 A | 3/1988 | Alferness | |
| 4,875,770 A | 10/1989 | Rogers et al. | |

(Continued)

FOREIGN PATENT DOCUMENTS

| CA | 2 064 488 C | 11/1992 |
|---|---|---|
| WO | WO 2009/134221 A1 | 11/2009 |

OTHER PUBLICATIONS

Henderson, Tom, The Physics Classroom, Glenbrook South High School, Glenview Illinois, Aug. 2007.*

(Continued)

*Primary Examiner* — Luke Ratcliffe
(74) *Attorney, Agent, or Firm* — Sterne, Kessler, Goldstein & Fox P.L.L.C.

(57) ABSTRACT

A laser Doppler velocimeter is formed using a fiber laser as the lasing medium. Within the velocimeter, all optical signals, transmitted and received, are conveyed by optical fibers. An amplifier amplifies a source laser, which is then transmitted to one or more transceivers. The one or more transceivers, each projecting along a different axis, and each with a single optical fiber input/output interface act as both the transmission device to focus the radiation at a target region, and as the receiving system for collecting reflected radiation. The transceivers each include an amplifier to further amplify the radiation received from the laser source. The one or more transceivers transmit radiation simultaneously to the target region, and may be located remotely from the laser source. The portion of the reflected radiation collected by the receiving system is analyzed to determine the Doppler shift caused by targets at the focal point of the one or more transceivers.

20 Claims, 8 Drawing Sheets

(56) References Cited

U.S. PATENT DOCUMENTS

| | | | |
|---|---|---|---|
| 4,932,775 A * | 6/1990 | Wissman et al. | 356/5.09 |
| 5,013,928 A | 5/1991 | Ikeda et al. | |
| 5,272,513 A | 12/1993 | Vahala et al. | |
| 5,307,197 A | 4/1994 | Tanabe et al. | |
| 5,400,350 A | 3/1995 | Galvanauskas | |
| 5,526,109 A | 6/1996 | Johnson | |
| 5,610,705 A * | 3/1997 | Brosnan et al. | 356/28.5 |
| 5,847,817 A | 12/1998 | Zediker et al. | |
| 5,864,644 A | 1/1999 | DiGiovanni et al. | |
| 6,141,086 A * | 10/2000 | Vahala et al. | 356/28.5 |
| 6,580,497 B1 | 6/2003 | Asaka et al. | |
| 7,043,112 B2 * | 5/2006 | Fukuchi | 385/24 |
| 7,428,253 B2 | 9/2008 | Murison et al. | |
| 7,869,811 B2 * | 1/2011 | Wirola et al. | 455/456.1 |
| 2002/0149839 A1 * | 10/2002 | Hamoir | 359/334 |
| 2003/0225514 A1 * | 12/2003 | Lokshin et al. | 701/213 |
| 2006/0140764 A1 * | 6/2006 | Smith et al. | 416/103 |
| 2006/0227316 A1 * | 10/2006 | Gatt | 356/5.09 |
| 2007/0064219 A1 * | 3/2007 | Rogers et al. | 356/28 |
| 2008/0004904 A1 | 1/2008 | Tran | |
| 2008/0094608 A1 * | 4/2008 | Holtkamp et al. | 356/28.5 |
| 2010/0134781 A1 | 6/2010 | Soreide et al. | |

OTHER PUBLICATIONS

Liem, A. et al., "25 W Ytterbium all fiber source at 1120 nm," *Lasers and Electro-Optics, CLEO '01 Technical Digest*, p. 216, ISBN: 1-55752-662-1 (2001).

International Search Report and Written Opinion, dated Aug. 7, 2008, for PCT Appl. No. PCT/US 08/05515, filed Apr. 30, 2008, 10 pages.

Supplementary European Search Report, dated Mar. 18, 2011, for European Patent Appl. No. 08779597.7, 7 pages.

Examination Report, dated Nov. 24, 2011, for European Patent Appl. No. 08779597.7, 3 pages.

Czarske, J.W., "Laser Doppler velocimetry using powerful solid-state light sources," *Measurement Science and Technology*, vol. 17, No. 7, ISSN: 0957-0233, pp. R71-R91 (Jul. 1, 2006).

First Office Action, dated Mar. 19, 2012, for Chinese Patent Appl. No. 200880128956.2, 20 pages.

Examination Report, dated Apr. 16, 2012, for European Patent Appl. No. 08779597.7, 3 pages.

Office Action, dated May 1, 2012, for U.S. Appl. No. 13/026,932, 11 pages.

U.S. Appl. No. 13/026,932, filed Feb. 14, 2011.

Kameyama, S., et al., "Compact all-fiber pulsed coherent Doppler lidar system for wind sensing," Applied Optics, vol. 46, No. 11, Apr. 10, 2007; pp. 1953-1962.

Nilsson, J., "High-power fiber lasers: Surge to power," Stanford Photonics Research Center Annual Meeting, Sep. 19-21, 2005; 55 pages.

International Search Report directed to related International Patent Application No. PCT/US2012/025108, mailed Sep. 24, 2012; 3 pages.

Notice of Allowance mailed Sep. 11, 2012 for U.S. Appl. No. 13/026,932, filed Feb. 14, 2011; 5 pages.

U.S. Appl. No. 13/618,140, Chang et al., "Laser Wind Velocimeter with Multiple Radiation Sources," filed Sep. 14, 2012.

Maeda, M. W., et al., "An Electronically Tunable Fiber Laser with a Liquid-Crystal Etalon Filter as the Wavelength-Tuning Element," IEEE Photonics Technology Lettersm vol. 2, No. 11, 1990; 3 pages.

Request for Re-Examination directed to related Canadian Patent No. 2,124,963, filed Jun. 29, 2012; 34 pages.

Re-Examination Notice directed to related Canadian Patent No. 2,124,963, mailed Oct. 31, 2012, from the Canadian Intellectual Property Office; 4 pages.

English-Language Translation of the Second Office Action directed to related Chinese Patent Application No. 200880128956.2, issued Dec. 12, 2012, from the State Intellectual Property Office of the People's Republic of China; 10 pages.

Notice of Allowance mailed Dec. 3, 2012 for U.S. Appl. No. 13/026,932, filed Feb. 14, 2011; 5 pages.

\* cited by examiner

LASER DOPPLER VELOCIMETER

BACKGROUND

This invention relates to laser Doppler velocimeters and in particular to laser Doppler velocimeters for measuring the velocity of wind or solid objects while compensating for motion of the laser Doppler velocimeter platform.

Conventional laser Doppler velocimeters ("LDVs") transmit light to a target region (e.g., into the atmosphere) and receive a portion of that light after it has scattered or reflected from the target region or scatterers in the target region. This received light is processed by the LDV to obtain the Doppler frequency shift, $f_D$. The LDV then conveys the velocity of the target relative to the LDV, v, by the relationship $v=(0.5)cf_D/f_t$ where $f_t$ is the frequency of the transmitted light, and c is the speed of light in the medium between the LDV and the target.

LDV's are extremely useful and have a wide range of applications including, but not limited to: blood-flow measurements, speed-limit enforcement, spaceship navigation, projectile tracking, and air-speed measurement. In the latter case the target consists of aerosols (resulting in Mie scattering), or the air molecules themselves (resulting in Rayleigh scattering).

An example of a conventional air speed LDV 10 is illustrated in FIG. 1 and as disclosed in U.S. Pat. No. 5,272,513, the disclosure of which is incorporated herein by reference. The LDV 10 includes a source 20 of coherent light which may, if desired, be polarized. The source 20 projects a first coherent beam of light 30 into a beam shaper 40. The beam shaper 40 expands and collimates the beam 30 after which beam 30 enters a telescope 60. The telescope 60 projects the beam 30 in nearly collimated form into the target region 45.

The collimated beam strikes airborne scatterers (or air molecules) in the target region 45, resulting in a back-reflected or backscattered beam 50. A portion of the backscattered beam 50 is collected by the same telescope 60 which transmitted the beam 30, or to an adjacent receiver telescope (not shown). The case where the same telescope transmits and receives the light is known as a monostatic configuration, while the case of separate transmit and receive telescopes is known as a bistatic configuration. Monostatic configurations can only receive backscattered light. Bistatic configurations can be arranged to receive light that is substantially backscattered or at any other angle relative to the transmitted beam 30.

The light 50 collected by telescope 60 is then combined with a separate reference beam of light 70 in an optical mixer 80. An ideal optical mixer combines the two beams in such a way that they have the same polarization and occupy the same space, and directs the result onto a photodetector with a bandwidth sufficient to detect the measured Doppler frequency shift. The photodetector produces an electrical current 85 which includes a component whose frequency is the mathematical difference between the frequency of the reference beam 70 and the backscattered beam 50. The electrical current 85 is then analyzed by a signal processor 90 (e.g. electrical spectrum analyzer or a frequency counter) to determine the frequency difference and calculate the relative velocity component along the axis of the telescope 60 between the LDV 10 and the target region 45.

Ambiguities regarding whether the measured relative frequency is either positive or negative can be resolved by using the "in-phase and quadrature" detection method, as is known in the art. Another approach to resolving these ambiguities is to apply a stable, constant frequency shift either to the transmitted beam 30 or to the reference beam 70 (e.g. by using an acousto-optic cell). This creates an alternating current component in the electrical signal 85 with a frequency that is the sum of the constant frequency shift and the Doppler frequency shift, removing the directional ambiguity. An LDV wherein the frequency of the transmitted beam 30 and the frequency of the reference beam 70 are identical is said to use homodyne detection. Heterodyne detection is used when the frequencies of the transmitted beam 30 and reference beam 70 are different.

The reference beam 70 is selected to have a well-defined and stable optical frequency that bears a constant phase relationship with the transmitted beam 30. This is known as coherence. The requirement for coherence is easily achieved by using a laser as the source 20 and tapping the source 20 to create the reference beam 70 by means of an optical splitter (not shown).

Source 20 can be either a $CO_2$, Nd:YAG, or Argon Ion laser (preferably lasing in the fundamental transverse mode and in a single longitudinal mode). However, air-speed targets (aerosols and/or molecules) generate very weak return signals compared to solid objects. Thus air-speed LDV's incorporating these laser sources that work over a range of thousands or even tens of meters require large amounts of laser power and are thus too large, bulky, heavy, fragile and possibly dangerous to be used in many desirable applications like air-speed determination for helicopters.

However, source 20 can also be a lightweight, low-cost, highly efficient, rare-earth-doped glass fiber (referred to hereafter as a fiber laser). Fiber lasers have several enormous advantages over other laser sources. Fiber lasers can be efficiently pumped by laser diodes whose emission wavelengths have been optimized for excitation of the rare-earth dopant. This makes the fiber lasers very energy efficient and compact, eliminating the need for cooling systems, flashlamps, and high current electrical sources. Moreover the glass fiber serves as a flexible waveguide for the light, eliminating the need for bulky optical components like mirrors and lenses that require rigid mechanical mounts in straight lines with stringent alignment tolerances. Fiber lasers are also more adaptable than solid-state lasers: the pulse repetition frequency ("PRF") and pulse width in fiber lasers may be changed "on the fly," while the PRF and pulse width in solid-state lasers are bound to narrow ranges or are even fixed.

Despite advances in conventional LDV's, improvements are still necessary. Sometimes it is desirable to locate the source laser 20 at a different, more accessible location than the telescope 60. For example, in a wind turbine generator ("WTG") application the telescope can be located on the turbine, while its source laser and control electronics are best located in the nacelle or at the base of the tower that supports the WTG for ease of maintenance. In sailing applications the source is preferably located within the hull of the ship where it is protected from exposure to the elements.

These remote configurations can be made conveniently by using optical fiber to connect the source laser 20 and the telescope 60. Problems have occurred, however, in that the large optical power required for air speed measurements becomes limited by a non-linear effect that occurs in fiber optics known as stimulated Brillouin scattering ("SBS"). In fact, the longer a fiber optic is, the lower this limit becomes. The SBS power limit depends on other factors known to those skilled in the art, but it is a fundamental physical property of light traveling through transparent media and cannot be ignored.

In addition to the fiber laser-related shortcomings described above, it is also desirable to use an LDV with more than one telescope, and preferably three or more telescopes where all of the telescopes are transmitting a beam of light within the target region or regions simultaneously. The plurality of telescopes are each aimed at a different area of the target region, allowing for simultaneous velocity measurements along a plurality of different axes, thus allowing for a multi-dimensional velocity determination. Conventional LDVs for meteorological measurements or applications generally incorporate a single motorized telescope that takes measurements sequentially along different axes, or use three telescopes, switching from one to the next, and so on, to allow sequential measurements along the different axes. By simultaneously transmitting light to the different areas of the target regions, the accuracy of the readings is greatly improved while eliminating the need for any moving parts and the timeliness of the measurements is improved. It is also desirable that any such improvements to conventional LDVs still result in the use of eye-safe radiation sources, preferably in the 1.4-1.6 micron range.

DETAILED DESCRIPTION

Figure 1:
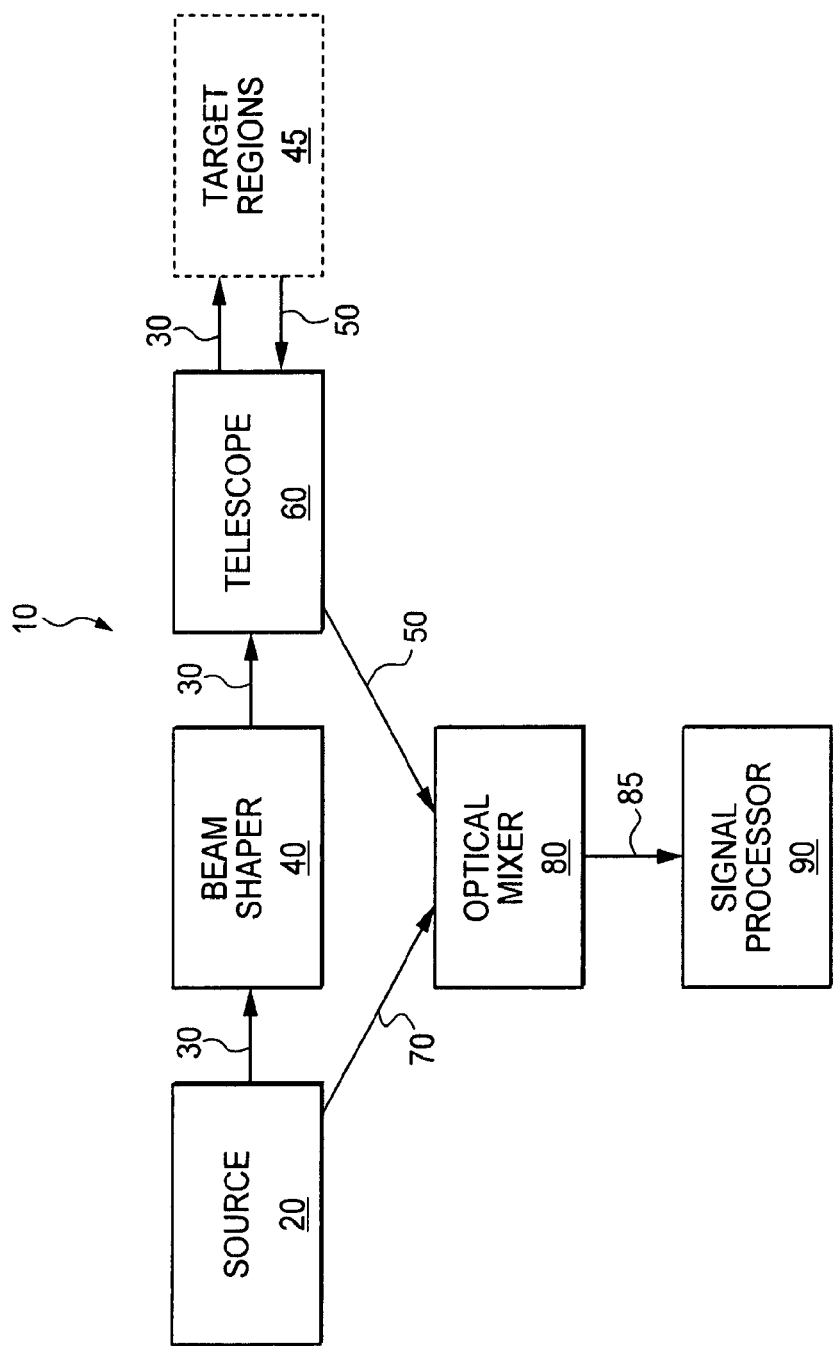
FIG. 1 illustrates a block diagram of a conventional laser Doppler velocimeter.

The disclosed velocimetry system addresses the needs identified above and provides for an LDV with no moving parts and which is lightweight enough to be used for many different applications which were, up to this point, not practical for LDVs. The disclosed LDV includes an active lasing medium, such as e.g., an erbium-doped glass fiber amplifier for generating and amplifying a beam of coherent optical energy and an optical system coupled to the beam for directing the beam a predetermined distance to a scatterer of radiant energy. The reflected beam is mixed with a reference portion of the beam for determining the velocity of the scatterer.

In using this device to measure wind velocity in the telescope focal volume, the velocity component that is measured is that component along the axis of the telescope. Therefore, for measurement of the "n" components of velocity, n independent measurements must be made along n noncolinear axes (where n is an integer). To accomplish this task n duplicate transceivers are disclosed, each carrying either a continuous wave ("CW") beam or are simultaneously pulsed with a common seed laser. Simultaneous pulsing and transmission through the n transceivers has the advantage that the velocity measurements each arise from the same moment in time, instead of from sequential moments in time. Thus, the resulting velocity determinations are more accurate as a result of simultaneous pulsing and transmission instead of sequential transmission.

By using optical fiber for both generation of the laser energy as well as wave guiding of the energy, the present invention provides a single, mechanically flexible conduit for light. This configuration allows the system to be inherently immune to vibration and temperature variation. The only point at which light leaves the optical fiber system is for projection from the respective telescopes. Each of the transmission telescopes is also a reception telescope and thus the aerosol-scattered return beam is automatically aligned with the respective telescope-fiber optic collection systems.

The use of fiber lasers such as e.g., erbium-doped optical fiber also has advantages in terms of the overall energy efficiency of the system. Because diode lasers are now available at the optimal pump wavelength of erbium doped glass, the erbium wave guide can be efficiently pumped by launching pump radiation down this wave guide. Thus, the system has greatly reduced cooling requirements and can operate off of a low voltage battery supply.

The disclosed velocimeter system is also eye-safe, lightweight, and easily scaled to high energy per pulse or CW operation. As described above, the velocimeter has "n" lines of sight. Thus, in order to determine an object's velocity or the wind velocity in one or more target regions, n telescopes are used, each simultaneously projecting a beam of light along a different axis. To determine three-dimensional velocity, as with wind velocity, three telescopes are used. To determine two- or one-dimensional velocity, e.g., for a car or boat moving on a plane or in a line, fewer telescopes may be used. The laser beams projected from the n telescopes are each pumped simultaneously and arise from a single laser source. The source may be co-located with the n telescopes, or may be located remotely with respect to the n telescopes. If the laser source is remotely located, fiber optic cables are used to carry the generated light beams to each telescope. As described below in greater detail, a seed laser from the source is amplified and, if desired, pulsed and frequency offset, and then split into n source beams. The n source beams are each delivered to an amplifier assembly that is located within the n transceiver modules, where each of the n transceiver modules also includes a telescope. Amplification of the n source beams occurs at the transceiver modules, just before the n beams are transmitted through the telescope lens to one or more target regions. Thus, when the n source beams are conveyed through connecting fibers from the laser source to each of the n telescopes within the respective transceiver modules, the power of each of the n source beams is low enough so as not to introduce non-linear behaviors from the optical fibers. Instead, power amplification occurs in the transceiver module, just before transmission from the telescope. Consequently, fiber non-linear effects are not introduced into the system.

The placement of the power amplifier within the transceiver modules just before laser beam projection through a lens reduces the effect of nonlinear fiber behavior that is normally observed when there is a greater propagation distance between the power amplifier and the lens. In this way, the disclosed velocimeter is able to use a single seed laser and amplifier assembly that is remote from the power amplifier. The seed laser generates a beam that may be amplified, pulsed, and frequency shifted before the beam is split, if necessary, and directed to the remote power amplifiers. Power amplification only occurs just before transmission of the source beam through the lenses. Thus, as long as the amplified result is still within the linear operating region of the fiber to the remote amplifier, the disclosed velocimeter avoids the problems associated with non-linear fiber operation.

By using the disclosed velocimeter, object or wind velocities may be measured with a high degree of accuracy. Because the source laser is split into n beams, the measurements taken along all of the n axes are simultaneous. Additionally, splitting the source beam into n beams does not necessarily require that the source laser transmit a laser with n times the necessary transmit power, because each of the n beams are subsequently power amplified before transmission. The n beams may each be directed towards the same target region or may be directed to multiple target regions. A single beam may be used to simultaneously measure velocities at multiple points or span along a single axis. Additionally, the disclosed velocimeter has no moving parts, and is thus of reduced size and improved durability. As explained below, the disclosed velocimeter may be used with a platform motion sensing device such as e.g., an inertial measurement unit ("IMU") or global positioning satellite ("GPS") unit so that the motion of the velocimeter platform may be compensated during calculation of the measured velocities. Thus, because of the lightweight and non-bulky nature of the velocimeter, and because of the velocimeter's ability to compensate for platform motion, the disclosed LDV may be mounted on any moving platform (e.g., a helicopter, a boat, etc.) and still obtain highly accurate readings.

Figure 2:
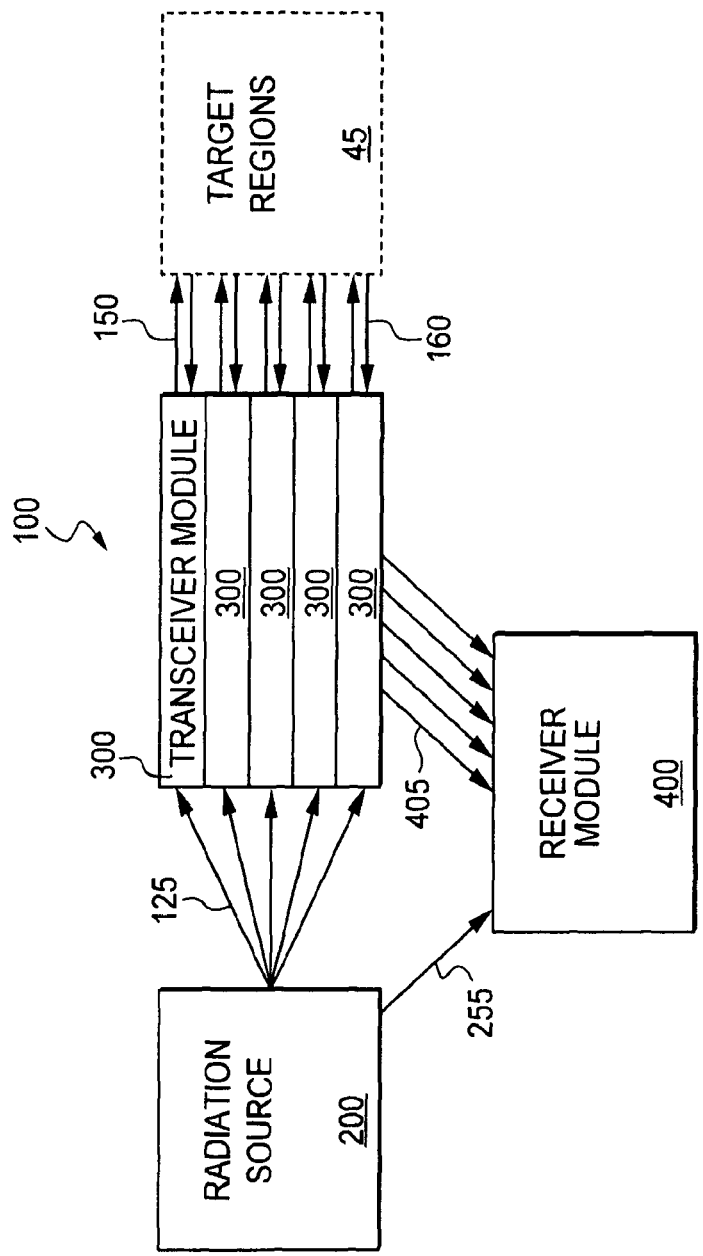
FIG. 2 illustrates a block diagram of an embodiment of a laser Doppler velocimeter.

Referring now to FIG. 2, a block diagram of an n-axis laser Doppler velocimeter system 100 is illustrated. The system 100 includes a radiation source module 200, n transceiver modules 300, and a receiver module 400. Each of the modules are described in detail below. The radiation source module 200 generates 'n' source beams 125 to the 'n' transceiver modules 300. The n transceiver modules 300 are for transmitting n beams of light 150 and receiving n scattered or reflected beams of light 160. The transceiver modules 300 may be located in a physically separate location than the radiation source 200 and the receiver module 400. Alternatively, depending upon the application, all modules may be co-located. The radiation source module 200 also outputs a reference beam 255 to the receiver module 400. The receiver module 400 combines the reference beam 255 with each of the scattered/reflected beams 160 received by the n transceiver modules 300 that are passed on to the receiving module 400 via optic fiber 405. Doppler shifts and hence, velocities, are calculated from the results of the combined signals.

Figure 3:
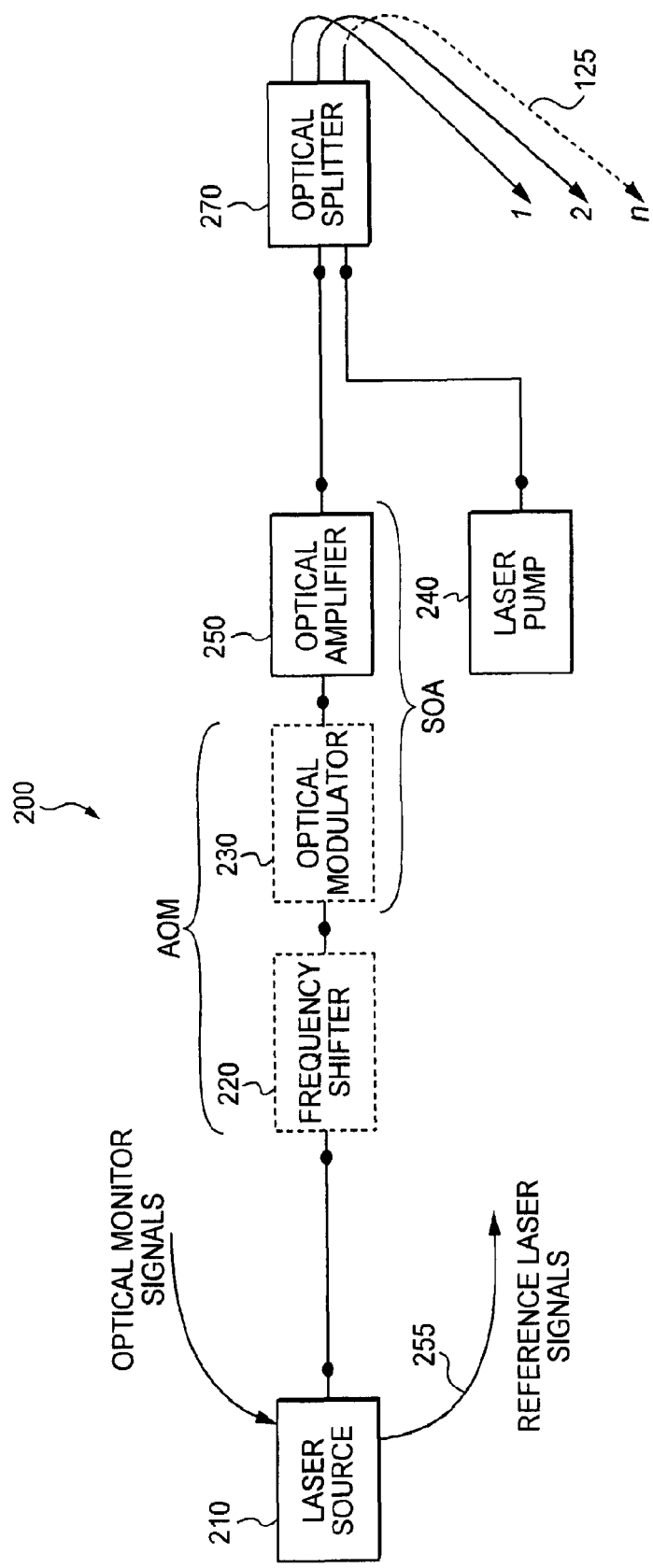
FIG. 3 illustrates a block diagram of an embodiment of a radiation source module of the FIG. 2 laser Doppler velocimeter.

The radiation source module 200 is illustrated in FIG. 3. The radiation source module 200 includes a laser source 210, an optical amplifier 250 (such as e.g., a fiber optic amplifier) and an optical splitter 270. The radiation source module 200 may also include a frequency shifter (such as e.g., an acousto-optic modulator) 220 and an optical modulator (such as e.g., a semiconductor optical amplifier) 230. Each of these components of the radiation source module 200 are coupled together and are described in greater detail below.

The laser source 210 and associated drivers and controllers provide the initial laser energy that feeds into optical amplifier 250. When the laser source output is combined with an amplifier, the result is a high power laser output. Typical laser sources 210 are small laser diodes (single-frequency or gain-switched), short-cavity fiber lasers, and miniature solid state lasers such as, for example, nonplanar ring oscillators ("NPROs"), or hybrid silicon lasers. The output from the seed laser source 210 is directed towards the optical amplifier 250, though if frequency shifting is desired, the output is directed towards the frequency shifter 220. A reference laser signal 255 is also output from the laser source 210.

The frequency shifter (such as an acousto-optic modulator ("AOM")) 220 and associated RF drivers provide a radio-frequency ("RF") offset to the laser source output. This offset facilitates the later determination by a signal processor of the direction of any detected motion. The offset is provided by utilizing the acousto-optic effect, i.e., the modification of a refractive index by the oscillating mechanical pressure of a sound wave. In an AOM, the input laser beam is passed through a transparent crystal or glass. A piezoelectric transducer attached to the crystal is used to excite a high-frequency sound wave (with a frequency of the order of 100 MHz). The input light experiences Bragg diffraction at the periodic refractive index grating generated by the sound wave. The scattered beam has a slightly modified optical frequency (increased or decreased by the frequency of the sound wave). The frequency of the scattered beam can be controlled via the frequency of the sound wave, while the acoustic power is the control for the optical powers. In this way, the frequency shifter 220 is used to provide a frequency offset to the laser source output. The AOM may also be used as an optical modulator 230 to modulate laser signals from the source laser 210 in order to obtain pulsed lidar measurements.

Additional modulation of the seed laser output may be provided using an optical modulator 230 (such as e.g., semiconductor optical amplifier ("SOA")). Although the SOA is not necessary for the system 100 to function, SOA-induced pulsing may be used to optimize the extinction ratio in the pulses. The SOA is capable of providing primary as well as secondary modulation of the seed laser source. The SOA may also be used to provide optical amplification to the laser source signal.

The optical amplifier 250 can be either a semiconductor-based booster optical amplifier ("BOA") or a fiber optic amplifier. The fiber optic amplifier includes a length of fiber doped by a rare earth element such as e.g., erbium (Er), erbuim-ytterbium (Er:Yb), etc. A single-mode ("SM") or multimode ("MM") pump diode is used to excite the dopant material within the doped fiber. Optical signals from the SOA may be combined with the pump signals via a wavelength division multiplexer ("WDM") or a tapered fiber bundle ("TFB"). In the optical amplifier 250, the source light is amplified to a level below the power limit dictated by optical damage and nonlinear effects of the fiber. Amplifier spontaneous emission from the optical amplifier 250 is managed via the use of narrowband bulk filters or fiber Bragg grating ("FBG") based filters.

Once filtered, the amplified light is passed through an optical splitter 270. The optical splitter 270 splits the light amongst the different transceiver modules 300. As explained below, the light from the radiation source module 200 is transmitted to optical amplifiers 330 located within each individual transceiver module 300. The use of an optical splitter instead of a switch or multiplexer allows the radiation source module 200 to be designed without any moving parts. In other words, no motors or switches need be used.

Light output from the optical splitter 270 and hence the radiation source module 200 is directed to the n transceiver modules 300 by way of n connecting fibers 125. The connecting fibers 125 allow the radiation source module 200 to be remotely located (if desired) from the n transceiver modules 300. As described above, the lasers carried by the connecting fiber bundle 125 are each at a sufficiently low power to avoid introducing the non-linear effects of the fiber. The fiber bundle 125 consists of multiple fibers of varying core sizes to carry different optical signals between the radiation source module 200 and the n transceiver modules 300. These optical signals include the amplified source laser signal as well as a multimode pump laser signal from a pump laser 240 for the pumping of amplifiers at each of the n transceiver modules 300. Furthermore, optical signals including optical monitor signals from the transceiver modules 300 are carried back to the radiation source module 200. The optical monitor signals can trigger the shutdown of the radiation source module 200 in the event of a malfunction or error at the transceiver modules 300.

Figure 4:
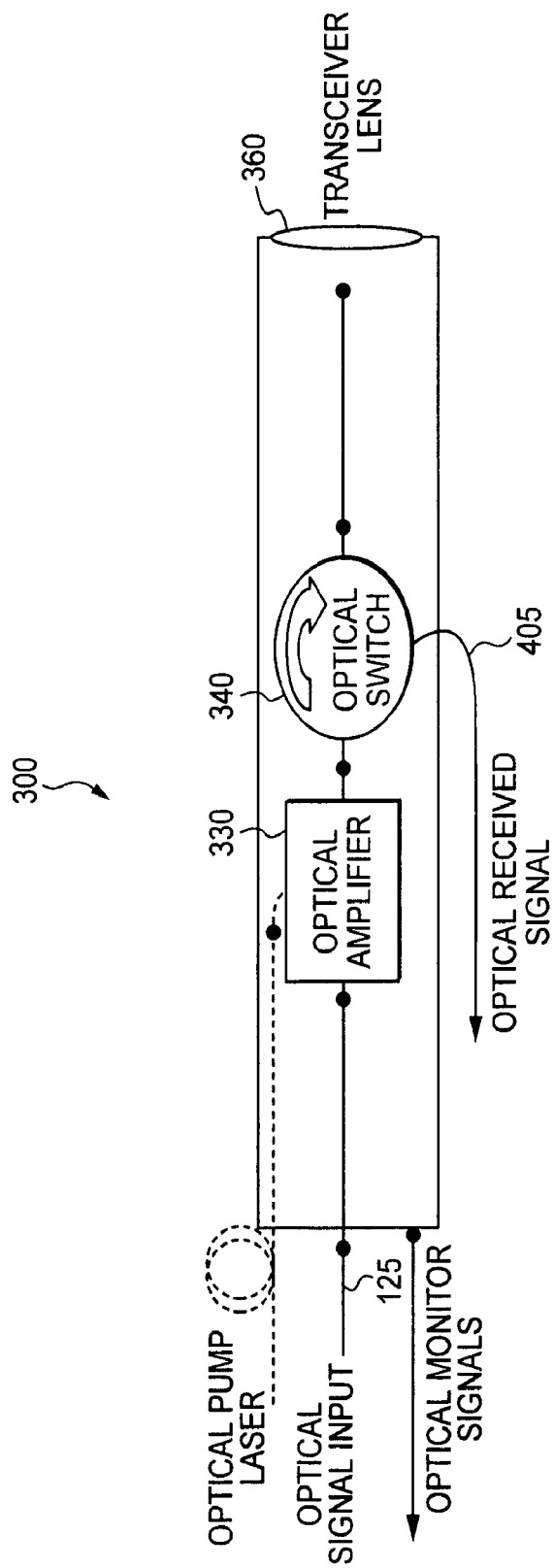
FIG. 4 illustrates a block diagram of an embodiment of a transceiver module of the FIG. 2 laser Doppler velocimeter.

One of the n transceiver modules 300 is illustrated in FIG. 4. Each of the transceiver modules 300 includes an optical amplifier 330 (such as a fiber optic amplifier), an optical switch 340 (such as e.g., a fiber optic circulator), and a transceiver lens 360 used to transmit and receiver optical signals from the target region 45 (of FIG. 2).

Amplified source laser signals from the radiation source module 200 transmitted via optical fibers 125 to each of the transceiver modules 300 are further amplified within each of the transceiver modules 300 via the optical amplifier 330. The optical amplifier 330 includes a rare earth doped fiber (such as e.g., Er:Yb double clad fiber). Pump light can be introduced into the rare earth doped fiber via a tapered fiber bundle ("TFB") in a co- or counter propagating manner relative to the seed laser signal from the radiation source module 200. The source laser signal is thus further amplified within the transceiver module 300. The output of the optical amplifier 330 is then directed towards an optical switch 340.

The optical switch 340 (such as e.g., a fiber optic circulator) allows a single lens 360 to be used to transmit and receive light, thus allowing the sensor to operate in a monostatic geometry. In the case where multiple lenses are used (at least one for transmitting a light beam and at least one for receiving a reflected light beam, e.g., a bistatic geometry), the optical switch 340 may not be necessary. The optical switch 340 may also be used in conjunction with an amplified spontaneous emission filter. Such a filter might be bulk optic or an FBG based filter. Such a filter may be installed to maintain laser eye safety, as necessary. It is often the case that these filters divert the amplified stimulated emission ("ASE") to another fiber optic. This diverted laser can be used to monitor the operation of the optical amplifier 330 to adjust the amplifier's power, or as a safety feature in remotely pumped applications. As a safety feature, a measurable drop in the diverted ASE could mean that the fiber cable has been severed and that the pump should be shutdown immediately. Alternatively, to reduce ASE in pulsed applications, the pump lasers themselves may be pulsed in synchronization. Pulsing the pump lasers also reduces power consumption, thus facilitating the use of battery operated systems.

Source light that reaches the transceiver lens 360 is projected onto a target object or region 45 (of FIG. 2). Scattered or reflected light is returned to the transceiver module 300. The transceiver lens 360 collects the scattered light back into the fiber. In the case of monostatic operation, the transceiver lens 360 focuses light back into the transmit fiber where the scattered light is separated out from the transmit beam by the optical switch 340. Otherwise, for example, in the case of bistatic operation, the scattered light is focused into a different fiber. The collected scattered light is carried via fiber 405 to the receiving module 400 of FIG. 2.

Figure 5:
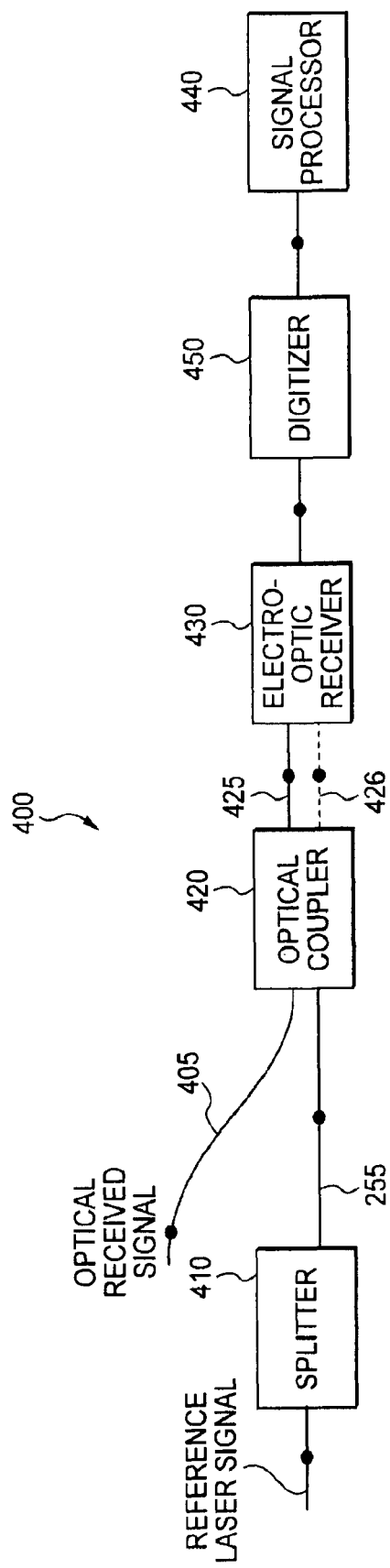
FIG. 5 illustrates a block diagram of an embodiment of a receiver module of the FIG. 2 laser Doppler velocimeter.

The receiver module 400 is explained in greater detail with reference to FIG. 5. The receiver module 400 includes an optical mixer 420 (e.g. a fiber optic coupler) for combining the received signal 405 with the reference laser signal 255 into the same space (e.g., an output optical fiber). This combined signal 425 is then directed onto an electro-optic receiver 430 (e.g. a photodiode) that converts the mixed optical signal into an electrical signal. This signal is then digitized (via a digitizer 450) for convenient signal processing in order to extract the Doppler frequency shift (via a signal processor 440). If n transceiver modules 300 are used then the reference laser signal 255 must be split into n beams by splitter 410 for mixing with n receiver modules 400. If n is large, then an optical amplifier may be required to boost the power of the reference beam 255 before splitting.

An optical mixer such as mixer 420 (e.g., a 3 dB fiber optic coupler) generally produces two output beams 425, 426 of opposite phase. Beam 425 is the combined signal, as explained above. Beam 426 may also be used and applied to a second electro-optic receiver to create a balanced receiver, as described in U.S. Pat. No. 4,718,121, the disclosure of which is incorporated herein by reference. Balanced receivers are preferably used because they use all of the mixed signal, and result in the cancellation of intensity noise in the reference laser beam 255.

Effective optical mixing also requires matching the polarizations of the received signal 405 and the reference laser signal 255. Mitigating the loss of mixing efficiency due to uncontrolled polarization may requires a more complicated optical mixing circuit than the one shown in FIG. 5, such as a polarization diversity receiver, described in U.S. Pat. No. 5,307,197, the disclosure of which is incorporated herein by reference.

The signal processor 440 receives the signal from the digitizer 450 and converts the signal into frequency space, calculates line-of-sight speeds from the Doppler shifts along each line-of-sight (i.e., from each of the n transceivers 310), and combines these speeds to determine a single velocity for the target object or region measured. Additionally, the signal processor 440 may use input from a motion sensor (preferably an attitude heading reference system or an IMU and a GPS or ground speed detection device) to determine if the platform upon which the transceivers 310 are mounted is moving. Any platform motion is detected and used to adjust or correct the measured velocity, as described in connection with FIG. 6.

Although not all applications of the disclosed LDV 100 require platform motion compensation, the disclosed LDV 100 (or at least the transceiver module 300 of the LDV 100) is portable and may easily be located on a moving platform such as a boat, ground vehicle or aircraft. As discussed above, the LDV 100 directly measures the relative motion of air scatterers with respect to the transceiver module 300 by detecting the Doppler frequency shift. If the LDV 100 is fixed to the ground, then its measurement is the wind speed and direction. However, an LDV 100 undergoing linear motion measures the relative wind speed and direction. If the linear speed and direction of the moving platform is known, then the wind speed can be extracted from the relative wind measurement. Additionally, the LDV 100 may undergo both linear and rotational motion as encountered on floating platforms. The rotational motion introduces an additional frequency shift since the optical focal volumes are moving rapidly through the air. This frequency shifts yields a speed measurement that is not necessarily useful to 1) meteorologists since it does not represent wind or 2) navigators since it does not represent relative wind. This rotational component must be isolated and compensated for in order to report useful wind data.

Figure 6:
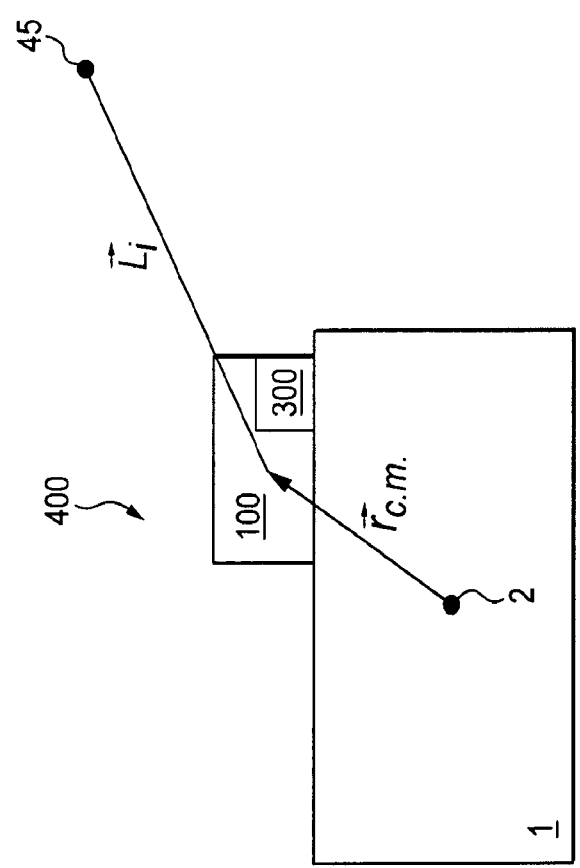
FIG. 6 illustrates a vector diagram of a motion compensation scheme for the FIG. 2 laser Doppler velocimeter.

Referring to FIG. 6, a vector diagram of a motion compensation scheme for the disclosed LDV is depicted. Platform motion of platform 1 is composed of linear translations of the platform's center of mass 2 and rotations about the center of mass 2. Mounted on the platform 1 is an LDV 100 with n transceiver modules 300. At least one of the n transceiver modules 300 (e.g., the $i^{th}$ transceiver module 300) is co-located with the LDV 100 on the platform 1. The velocity of the $i^{th}$ focal volume or target region 45 is given by Equation 1, below:

$$\vec{v}_{fi} = \vec{v}_{c.m.} + \vec{\omega} \times \vec{r}_i,$$  Eq. 1.

where $\vec{v}_{c.m.}$ is the linear velocity of the center of mass 2 of the platform 1 (and thus the LDV 100), $\vec{\omega}$ is the angular velocity of the platform 1, and $\vec{r}_i$ is the displacement vector from the center of mass 2 of the platform 1 to the $i^{th}$ focal volume or target region 45. The displacement vector is $$\vec{r}_i = \vec{r}_{c.m.} + \vec{L}_i, \text{ where } \vec{r}_{c.m.}$$

is a vector from the center of mass 2 of the platform 1 to the transceiver modules 300 and $$\vec{L}_i = f\hat{L}_i$$

and is a vector from the $i^{th}$ transceiver module 300 to the $i^{th}$ focal volume or target region 45. The magnitude factor $f$ is either the focal length in a focused system or the range in a range-gated system. The Doppler frequency shift created by this velocity is proportional to its component ($\delta_i$) along the laser line of sight $\hat{L}_i$: The $i^{th}$ Doppler frequency shift is equal to $2\delta_i/\lambda$, where $\lambda$ is the laser wavelength and:

$$\delta_i = \vec{v}_{fi} \cdot \hat{L}_i = \vec{v}_{c.m.} \cdot \hat{L}_i + (\vec{\omega} \times \vec{r}_i) \cdot \hat{L}_i.$$  Eq. 2.

The first term of Equation 2 (i.e., $\vec{v}_{c.m.} \cdot \hat{L}_i$) is the desired shift due to the relative linear motion between the $i^{th}$ target region 45 and the moving platform 1. The second term of Equation 2 (i.e., $(\vec{\omega} \times \vec{r}_i) \cdot \hat{L}$) represents the rotational motion and can be written as $$(\vec{r}_{c.m.} \times \hat{L}_i) \cdot \vec{\omega}$$

using the rules of cross products with the fact that $$(\vec{\omega} \times \vec{L}_i) \cdot \hat{L}_i = 0.$$

The procedure for motion compensation in a three-dimensional system is to measure the three raw Doppler shifts and the angular velocity with an IMU, then subtract off $$(\vec{r}_{c.m.} \times \hat{L}_i) \cdot \vec{\omega}.$$

This corrected frequency shift is used to compute the three-dimensional relative wind at the $i^{th}$ target region 45.

The angular velocity and attitude (pitch/roll angle) of a moving platform may change rapidly with time. It is important to measure the Doppler shift in a short amount of time so as to allow an assumption that the state motion is frozen (thus allowing the assignment of one value of angular velocity and attitude to each measured Doppler frequency shift). Accordingly, the laser pulse repetition frequency ("PRF") and the number of pulses $N_{acc}$ are chosen so that the total time of data collection (i.e., $N_{acc}$/PRF) is less than 200 milliseconds, for example. The angular velocity is measured before and after the $N_{acc}$ pulses are collected and the average value is used in the compensation calculations for $\vec{\omega}$.

Figure 7:
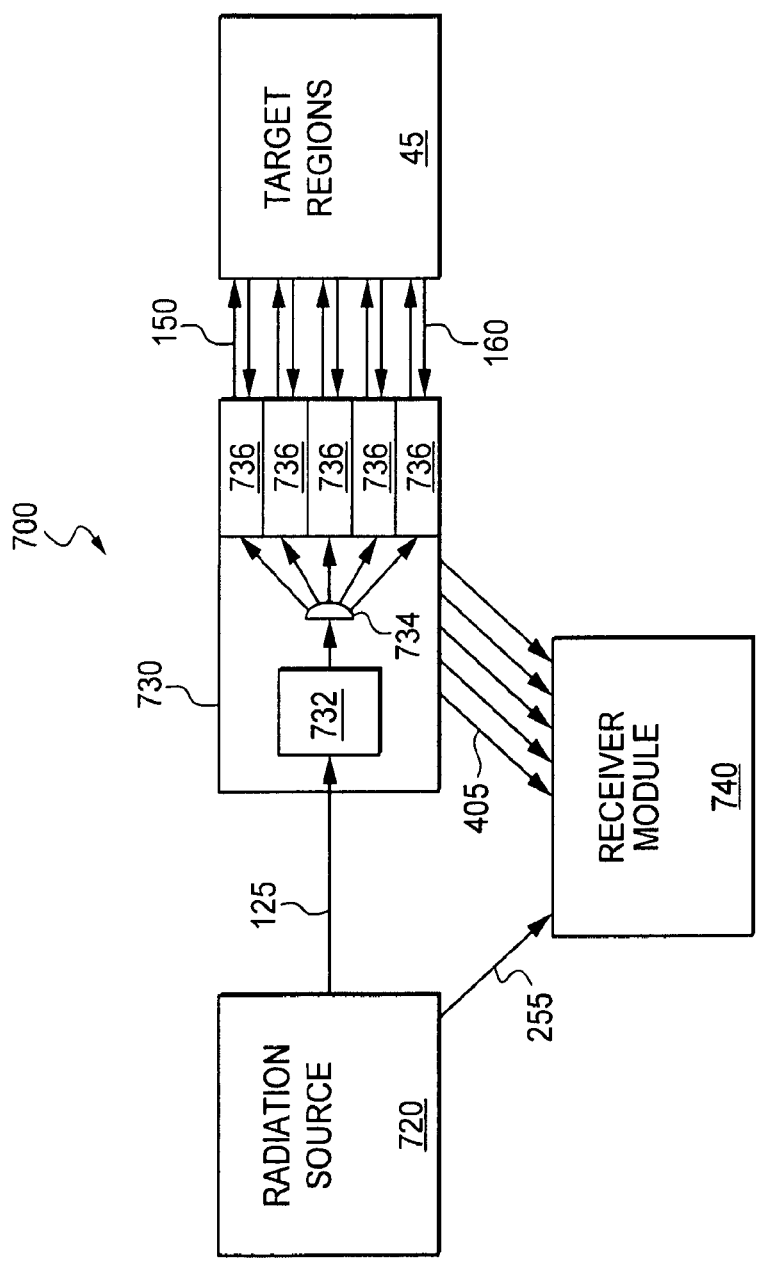
FIG. 7 illustrates a block diagram of an embodiment of a laser Doppler velocimeter.

Although LDV 100 has been described in reference to the system and module architectures depicted in FIGS. 2-5, these architectures are exemplary and are not intended to be limiting. For example, FIG. 7 illustrates an additional LDV architecture in the form of LDV 700. As in LDV 100 (of FIG. 2), LDV 700 includes a source module 720, a transceiver module 730 and a receiver module 740. However, in LDV 700, the source module 720 does not include a splitter. Instead, radiation generated at the source module 720 is conveyed to the transceiver module 730, where the generated radiation is amplified by amplifier 732 and then split via splitter 734 for use by the n transceivers 736 in the transceiver module 730. In LDV 700, only one remote amplifier 732 is used instead of n remote amplifiers.

Figure 8:
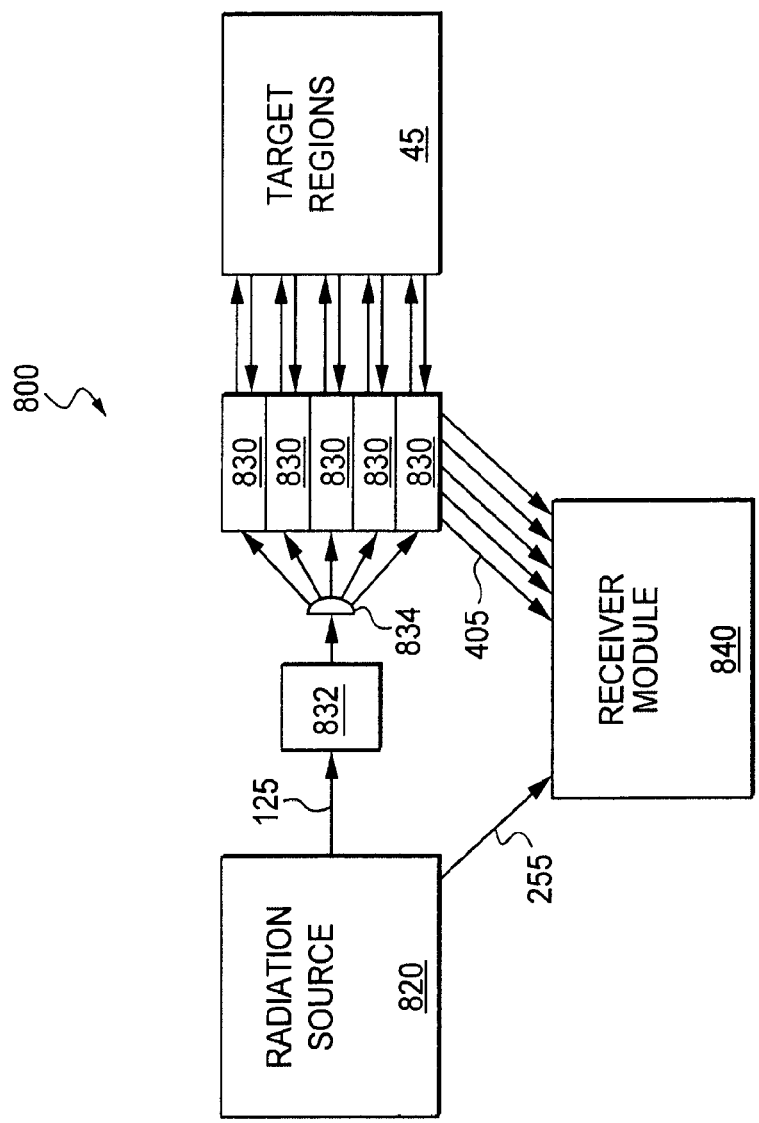
FIG. 8 illustrates a block diagram of an embodiment of a laser Doppler velocimeter.

FIG. 8 illustrates an additional LDV architecture in the form of LDV 800. Here, LDV 800 includes a source module 820, one or more transceiver modules 830 and a receiver module 840. The source module 820 does not include a splitter. Also, the transceiver modules 830 do not include amplifiers. Instead, an external amplifier 832 and splitter 834 are used. Radiation is generated at the source module 820 is conveyed to the remote amplifier 832 where it is amplified and then split via splitter 834 for delivery to the n transceiver modules 830 which each include a transceiver 836. As in LDV 700 (of FIG. 7), only one remote amplifier 832 is used in LDV 800.

The disclosed LDV embodiments have been explained in the context of fiber-optic-connected modules in a way that allows the transceiver modules 300, 730, 830 and optical amplifiers 330, 732, 832 to be remotely located from the radiation source modules 200, 720, 820. The transceiver modules 300, 730, 830 need not include any electronics and can be purely optical modules. Motion compensation, laser sources, and signal processing occurs at the radiation source modules 200 720, 820 and receiver modules 400, 740, 840. Thus, the operation of the transceivers 300, 730, 830 is significantly improved due to less noise from the radiation source modules 200, 720, 820 and receiver modules 400, 740, 840, greater mounting stability and easier maintenance. It is to be understood, however, that the foregoing descriptions of LDVs 100, 700, 800 are purely exemplary and are not intended to be limiting.

What is claimed as new and desired to be protected by Letters Patent of the United States is:

1. A velocimeter comprising:
   a coherent source configured to produce a coherent beam;
   a modulation system configured to add a frequency shift to the coherent beam to produce a modulated beam;
   an optical amplifier configured to amplify the modulated beam;
   a transceiver configured to receive the amplified beam via a first optical fiber, the transceiver including an amplifier configured to further amplify the amplified beam, and the transceiver configured to transmit the further amplified light to a target region and to receive reflected light from the target region;
   wherein the modulation system is located between the coherent source and the transceiver, and a receiver coupled to the transceiver via a second optical fiber and coupled to the coherent source via a third optical fiber, the receiver configured to:
  receive the reflected light from the transceiver,
  receive a reference light from the coherent source, and
  determine a Doppler shift based on the reflected and reference light.

2. The velocimeter of claim 1, wherein the modulation system is further configured to perform modulations of the beam from the coherent source.

3. The velocimeter of claim 1, further comprising:
  a splitter configured to split the modulated beam from the optical amplifier into n amplified beams, n being a positive integer; and
  n transceivers and n first optical fibers,
  wherein the n transceivers are configured to receive respective ones of the n amplified beams via the n first optical fibers, to further amplify the n amplified beams, and to transmit and receive the n further amplified beams to the target area.

4. The velocimeter of claim 1, wherein at least one of the optical amplifier and the amplifier is comprised of a rare earth doped fiber.

5. The velocimeter of claim 1, wherein the receiver comprises a signal processor configured to perform the determining of the Doppler shift.

6. The velocimeter of claim 1, wherein the receiver is further configured to determine a velocity of one or more objects in the target region based on the determined Doppler shift.

7. The velocimeter of claim 6, wherein the receiver is further configured to adjust the determined velocity by accounting for movement of the transceiver.

8. The velocimeter of claim 7, wherein the receiver further comprises an altitude heading reference system, an inertial measurement unit, a global positioning system, or a ground speed detection device configured to determine the movement.

9. The velocimeter of claim 1, wherein the transceiver further comprises a switch configured to allow transmission of the further amplified light through a lens in a transmission position and to allow reception of the reflected light through the lens in a receipt position.

10. The velocimeter of claim 1, wherein at least one of the velocimeter and transceiver is arranged as a handheld device.

11. The velocimeter of claim 1, wherein the coherent source is configured to operate based on a received operational status of the transceiver.

12. The velocimeter of claim 3, wherein the n transceivers are configured to substantially simultaneously transmit respective ones of the n further amplified beams to different ranges from the transceiver.

13. A method of determining a velocity of scatterers in a target region, comprising:
  generating a coherent beam:
  adding a frequency shift to the coherent beam with a modulation system;
  amplifying the modulated beam with at least first and second amplifiers;
  transmitting the amplified beam from a transceiver towards the target region;
  receiving reflected radiation from the target region at the transceiver;
  combining the received reflected radiation with a reference radiation beam; and
  determining the velocity of the scatterers in the target region based on the combined received and reference beams.

14. The method of claim 13, further comprising generating the coherent beam using an erbium clad fiber.

15. The method of claim 13, further comprising conveying the coherent beam using optical fibers between at least one of the frequency shift, the amplification, and the receiving.

16. The method of claim 13, wherein the amplifying further comprises using a rare earth doped fiber for at least one of the first and second amplifiers.

17. The method of claim 13, wherein the determining further comprises compensating for any motion of the transceiver.

18. The method of claim 13, further comprising generating the coherent beam based on receiving information regarding an operational status of the transceiver.

19. The method of claim 13, further comprising:
  splitting the coherent beam between the at least first and second amplifiers, such that a plurality of transmitters are utilized to transmit the amplified beam to a plurality of target regions and to receive the reflected radiation from the plurality of the target regions.

20. The method of claim 19, wherein the amplified beams are substantially simultaneously transmitted from the plurality of the transceivers towards the plurality of the target regions at different ranges.

* * * * *